July 19, 1938.   C. W. HAZELETT   2,123,894
METHOD OF PRODUCING HOLLOW METALLIC SHAPES AND APPARATUS THEREFOR
Filed Aug. 21, 1935   4 Sheets-Sheet 1

INVENTOR.
CLARENCE W. HAZELETT
BY
ATTORNEY.

July 19, 1938.  C. W. HAZELETT  2,123,894
METHOD OF PRODUCING HOLLOW METALLIC SHAPES AND APPARATUS THEREFOR
Filed Aug. 21, 1935  4 Sheets-Sheet 2

INVENTOR.
CLARENCE W. HAZELETT
BY
ATTORNEY.

July 19, 1938.   C. W. HAZELETT   2,123,894
METHOD OF PRODUCING HOLLOW METALLIC SHAPES AND APPARATUS THEREFOR
Filed Aug. 21, 1935   4 Sheets-Sheet 4

INVENTOR.
CLARENCE W. HAZELETT
BY
ATTORNEY.

Patented July 19, 1938

2,123,894

UNITED STATES PATENT OFFICE 2,123,894

METHOD OF PRODUCING HOLLOW METALLIC SHAPES AND APPARATUS THEREFOR

Clarence W. Hazelett, Greenwich, Conn.

Application August 21, 1935, Serial No. 37,116

38 Claims. (Cl. 29—33)

The present invention relates to a method of producing metallic shapes directly from molten metal and more particularly to a method of producing tubular products directly from molten metal.

It is known that heretofore metallic tubular products and similar articles have been produced almost entirely from metal in the solid state. Thus, the most common methods of manufacturing tubular products were the welding process and the seamless process, in which a solid metallic ingot was subjected to a long series of manufacturing steps which included several annealing operations, careful inspecting and handling of the material at every stage of the process, etc. Furthermore, the processes produced an excessive amount of scrap and required a large amount of special and costly equipment, skilled labor, extensive floor space, high power consumption, etc. For instance, in the welding process the metal was first cast into an ingot of suitable form and size, which after being carefully cropped, inspected and cleaned was reheated to the proper temperature, and then was rolled in a multiple stand mill, specially designed for the purpose, to a strip, the width of which corresponded to the circumference of the tube and the gauge to the thickness of the wall. After the forming of the strip, which required several rolling operations and intermediate annealing and accurate control especially in the last stages of the rolling, at least eight additional steps or more were necessary in the manufacture of tubing by the welding process, such as scarfing, bending, welding, sizing, straightening, cutting, inspecting, etc. Furthermore, as the apparatus for performing these operations had to be varied to adapt it to different sizes of pipe, several units were required, each unit being adapted to produce a certain range of sizes only. In the seamless process, after being carefully cropped, inspected and cleaned the ingot was reheated to the required temperature and rolled into round billets of the proper length and diameter to make the size and length of the tube required. The round ingots were then centered, reheated to the proper temperature and then pierced in a special piercing machine. Pierced billets are passed through an expander, given 2 passes in a plug mill, given 2 passes through a reeler, and then sent through a five stand sizing mill. The tubes are then straightened to produce a finished tube of the required size. The production of tubing by the seamless process was particularly expensive, necessitated special equipment and expert handling, and required high power consumption. Furthermore, several units of the special apparatus were required for producing tubing of different sizes.

It is one object of the present invention to overcome prior disadvantages and shortcomings and to produce tubular products directly from metal in the molten state.

It is another object of the present invention to provide a method of producing tubular products directly from molten metal which is simple, economical and practical, and which is capable of being carried into practice on an industrial scale easily and satisfactorily.

A further object of the invention is to produce seamless tubular products at reduced cost, to eliminate scrap loss, and to lower floor space requirements and power consumption.

Furthermore, the invention contemplates producing directly from the molten metal and substantially in one continuous operation tubular or hollow products having approximately the required size, shape, finish, concentricity, and crystalline structure.

Another object of the present invention is to produce directly from the molten material composite seamless tubular products having a plurality of concentric walls composed of the same or of different material, or of composite products comprising a core of a solid material and one or more unalloyed concentric layers composed of different or of the same material.

Moreover, the invention provides a simple and efficient apparatus which is capable of carrying the invention into practice.

Other features and objects of the invention will become apparent from the following description taken in conjunction with the accompanying drawings in which:—

Generally speaking, according to the principles of the present invention, tubes or similar products are produced by passing a relatively cold mandrel through a body of molten metal or other plastic material, whereby said molten metal or plastic material solidifies on the surface of the cold mandrel and forms thereon an outer shell of solid material, which may then be separated from the inner mandrel to form a tube, as hereinafter more fully explained.

I have discovered that when a cold mandrel is passed through a bath of molten metal under certain specially controlled conditions, hereinafter more fully described, I am able not only to produce on the outer surface of the mandrel a concentric shell of solid metal which is dense and substantially free from blow-holes, but I am also able to control the thickness of the solid shell substantially to any desired value, and furthermore, maintain the thickness of said shell substantially constant. Thus, I have found that I can control the thickness of the solid cast metal which is formed on the mandrel by properly controlling and correlating the temperature of the mandrel and of the molten metal, and/or by controlling the time of contact between the mandrel and the metal. Thus, I can increase the thickness of the shell by lowering the temperature of the mandrel or of the molten metal, or of both, or by increasing the depth of the metal bath, or by retarding the rate of travel of the mandrel. Of course, the aforementioned controlling factors should be properly balanced to produce the best results desired. In practice, I have found that good results may be obtained by maintaining the temperature of the molten metal at a substantially low value and preferably within about 100° C. above its melting point. Likewise, I have discovered that the rate of travel of the mandrel should be sufficiently high, depending on the depth of the metal bath, to prevent the mandrel from becoming overheated and causing re-melting of the solid metal which has already been solidified on the mandrel.

A special feature of the invention is that I provide for all parts of the mandrel to remain in contact with the molten metal for the same length of time and that I prevent detrimental localized variations in temperature in the path of the molten metal, such as might be caused by the direct impingement of a stream of hotter metal on the mandrel, and thereby I obtain a solid shell of substantially uniform thickness.

On leaving the body of molten metal, the mandrel will have a substantially uniform and dense outer shell having the desired and substantially constant wall thickness. In order to facilitate the separation of the mandrel from the solid outer shell, I then subject the composite product to work applied principally at right angle to the surface of the mandrel, such as by reeling, which by causing the outer shell to be plastically deformed over the more rigid mandrel, decreases the thickness of the shell and increases its inside diameter. In practice, I prefer to apply this rolling-on process to the outer shell as it leaves the molten bath and is still at a relatively high temperature and, consequently, more plastic. Furthermore, due to the fact that the outer shell is at a higher temperature than the mandrel and, accordingly, contracts more on cooling, by expanding the hot outer shell over the solid cold mandrel before it cools, I prevent the formation of relatively high internal stresses and possible splitting of the shell. Moreover, as the rolling-on process plastically deforms the metal of the outer shell, it not only serves the purpose of making the removal of the mandrel easy, but it also breaks up and refines the cast structure of the metal and produces a tubular product having a stronger and denser structure.

For the purpose of giving those skilled in the art a clear understanding of the present invention, the following description of a preferred form of apparatus in which my process may be carried into practice, is given by way of example.

Figures 1, 7, 8:
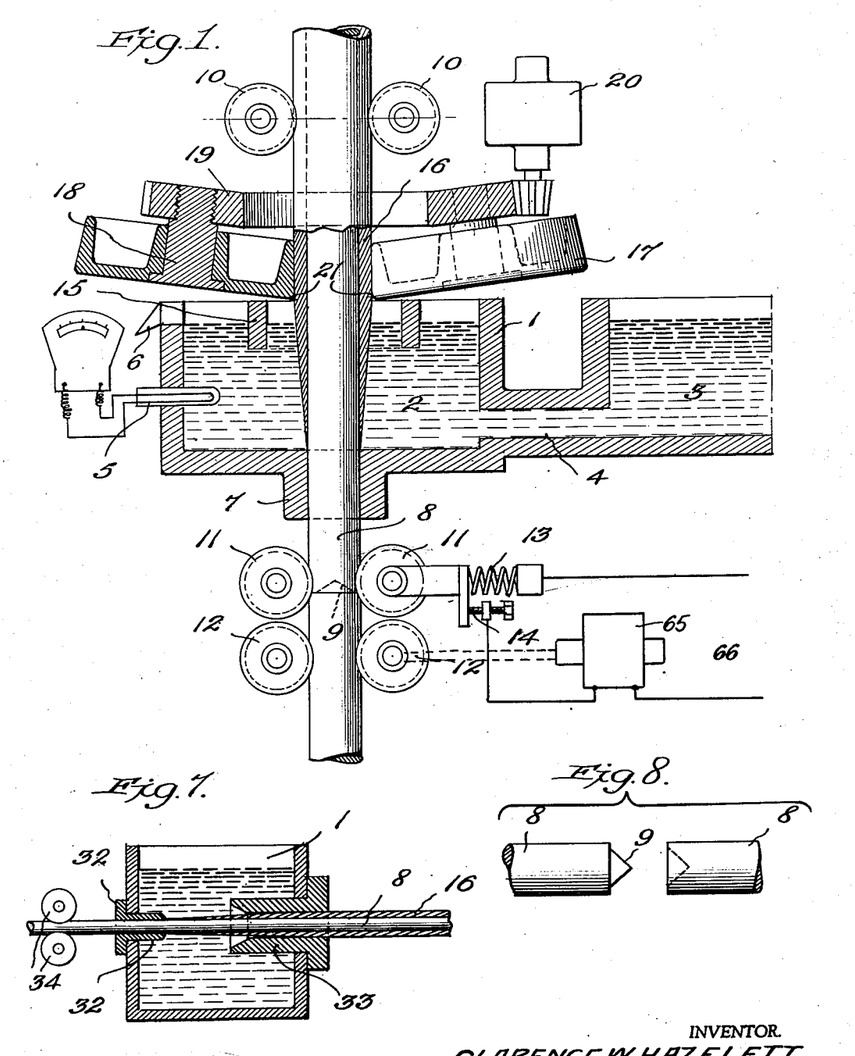
Fig. 1 is an elevational view, partly in section and partly broken away for purposes of clarity, of a tube forming apparatus embodying the principles of the present invention.
Fig. 7 is a view similar to Figs. 1 and 4 of a modified embodiment of the invention.
Fig. 8 is detail views, partly in section of the joints of the mandrels used in the formation of the tubes.

Referring more particularly to Fig. 1, reference character 1 indicates a receptacle for holding a body of molten metal 2 which is supplied from a main reservoir or furnace 3 through conduit 4. For reasons which will be explained more fully hereinafter, I prefer to have conduit 4 at a tangent to receptacle 1, such as in the customary involute form used for pumps, so that the incoming metal stream will enter at a tangent to the walls of the receptacle 1 and will give the bath a uniform circular motion. The temperature of the molten metal is recorded by pyrometer 5. The height of molten metal bath 2 in receptacle 1 may be controlled by outlet port 6. The bottom of receptacle 1 is provided with port 7 through which mandrel 8 is passed in an upward direction through the bottom wall of the receptacle and then through the molten metal bath 2. Of course, I may provide port 7 with a replaceable nozzle of a suitable material, especially when forming tubing from a high melting point metal.

The fit between mandrel 8 and port 7 or the replaceable nozzle, should be close enough to prevent the molten metal from flowing down into the port under the static pressure of the bath. I found that a free sliding fit is sufficient to prevent running down of the metal when the mandrel is traveling through the port at its normal speed. Thus, in actual practice, I found that about 0.005" clearance is sufficient when using a ½" mandrel and about 0.010" clearance when using a 2" mandrel. When the clearance is excessive, molten metal will run down into the port, freeze and then will be pulled up again, thereby producing a leafy surface on the inside of the tubing.

The length of mandrel 8 depends on the length of tubing desired. In order to provide for a continuous passage of any number of mandrels through receptacle 1, I provide any suitable fit or connection between the trailing end and the leading end of the mandrels. For instance, the mandrels may be centered as shown at 9, which will allow the mandrels to be fed through successively and still to be easily separated after the tubing is formed.

A continuous passage of mandrels 8 through receptacle 1 may be maintained by pulling rolls 10, which engage the finished product or the mandrel and the tube, and by pushing rolls 11 and 12 which move the cold mandrels upwardly through the molten metal. In connection with the aforementioned rolls, I prefer to use a safety device which will stop the rolls when one mandrel fails to be followed by another mandrel, and thereby prevent port 7 from remaining open at any time. For instance, as shown in Fig. 1, spring 13 may be operatively connected to rolls 11 and force said rolls closer together when there is no mandrel between them, thereby opening an electrical contact 14 which stops, in any suitable manner, the pulling of rolls 10, or the pushing of rolls 12. As indicated in the drawings by way of example, a motor 65 is provided for driving rolls 12 and is electrically connected to a power line 66, the circuit being completed through contact 14. When there is no mandrel between rolls 11, the electrical contact 14 will be interrupted and motor 65 will be stopped.

When using a blanket of flux or when the metal bath is open to the atmosphere, I prefer to use a skimming device of suitable construction to maintain the surface of the bath clear of flux, slag, oxides, etc. in the region where the mandrel with the surrounding cast shell emerges from the bath. For instance, I may use a skimming thimble 15 or a ring of small diameter floating over the metal bath around the emerging tube. It is sufficient that the height of thimble 15 be equal to or slightly higher than the height of the blanket of flux used. A ring about 1" high is satisfactory. The inside diameter of the ring should be as small as possible to prevent exposing too much surface of the molten metal to the air without, however, being picked up by the tube. I may provide means or stops for preventing the thimble from moving in contact with the tube, or if desired I may support the thimble in a stationary position.

At a convenient distance from the surface of the bath, I preferably have suitable means for smoothing, sizing, pressing or working the cast tube 16 which is formed on mandrel 8 as it travels through the molten metal. In Fig. 1, I show a preferred embodiment of the above working means, which comprises water cooled rolls 17 turning on spindles 18 which are mounted on a rotatable frame 19. The frame 19 is centered around tube 16 and is adapted to revolve axially around the same by driving motor 20. Rolls 17 which may be rounded at the lower edge 21 of the working face, are preferably mounted on water cooled ball bearings and are inclined a few degrees from the horizontal and at an angle with each other, so that they will be driven by the friction between the surface of the rolls and the plastic metal on the surface of the tube 16 as it emerges from the molten bath. In practice, I found that it is convenient to have the diameter of working rolls 17 about five times the outside diameter of tube 16. As a convenient means for centering mandrel 8, I preferably use 3 rolls 17 equally spaced around the mandrel. In order to prevent the tube 16 from turning around its axis as it is forced between rolls 17, said rolls 17 may be made to revolve as one unit around the tube by rotating the frame 19 at a suitable speed through driving motor 20. Of course, other suitable reeling machines, or other means of working the tube 16 may be employed.

Figure 4:
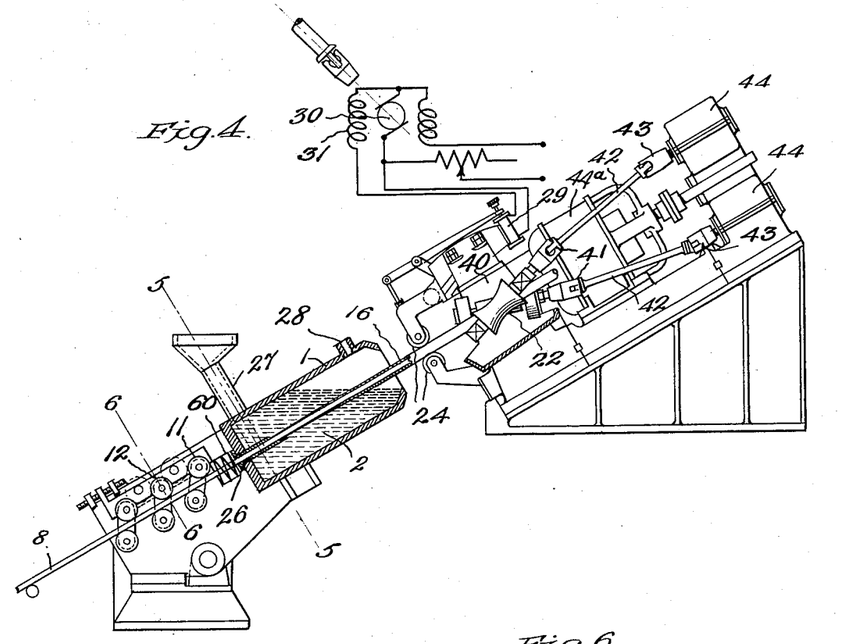
Fig. 4 is an enlarged view of a portion of Fig. 2, showing more in detail a side view, partly in section and partly broken away, of a tube forming apparatus and of a reeling machine.
Figure 5:
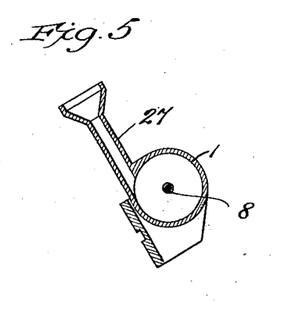
Figs. 5 and 6 are fragmentary sectional views on the lines 5—5 and 6—6, respectively, of Fig. 4.

In Fig. 4, I show another preferred form of apparatus for producing tubes by the present invention in which the mandrel travels obliquely instead of vertically. The latter apparatus is more advantageous for the production of long tubes, as it avoids the necessity of high buildings or deep pits. In Fig. 4, receptacle 1 for holding molten metal 2 comprises a vessel which is inclined at a convenient angle. A proper amount of molten metal is supplied through inlet 27 which preferably admits the metal into vessel 1 in a tangential direction. The molten bath may be maintained to a constant depth by allowing the metal to overflow at the top of the vessel 1 or through suitably placed outlets. Inlet 28 is for admitting a reducing or neutral atmosphere in the vessel for preventing oxidation of the metal bath. A natural gas atmosphere is satisfactory with metals having a melting point up to 2200° F. Dry CO gas or other suitable atmospheres may also be used. The lower end of vessel 1 is provided with nozzle 26 through which mandrels 8 are admitted into the molten bath as previously described. It is to be noted that the upper side of the outlet end of nozzle 26 is cut at an angle which makes it substantially horizontal or parallel to the surface of the molten metal. By having the outlet part of nozzle 26 fitting snugly over mandrel 8 and substantially parallel to the upper level of the bath, all parts of the mandrel will be in the bath substantially the same length of time, thereby insuring the production of a concentric tube having a substantially uniform cross-sectional wall thickness.

In conjunction with the apparatus illustrated in Fig. 4, I show another preferred form of a device for working tube 16 over mandrel 8. This device preferably comprises a reeling machine with a pair of rolls 22, one of which has a parallel working face, while the surface of the other is concave as used in conventional straightening or reeling machines. These rolls properly mounted in housing 40, are set at an angle to each other, so the axis of the straight roll will lie in a plane which is nearly parallel to the plane of the axis of the other roll with the concave surface. One end of the neck of rolls 22 is connected by universal joints 41 to spindles 42 which are connected in turn at the other end by another pair of universal joints 43 to a train of gears 44, mounted in a housing. Gears 44 and spindles 42 transmit to rolls 22 the power of a suitable motor 44a, the universal joints 41 and 43 taking care of the angularity of the rolls. Gears 44 are arranged so as to revolve rolls 22 in the proper direction and at the proper relative speed. The reeling machine not only sizes, smooths and expands tube 16 over mandrel 8 but also acts as a pulling unit. Rolls 22 are laterally adjustable to control the amount of work to be imparted to the tube 16, and are driven so as to coordinate their pulling speed to the pushing speed rolls 11 and 12 which push the cold mandrel into the vessel 1. Preferably, I place the reeling unit at such a distance from vessel 1 that the forward end of the mandrel will be just caught between the rolls as the trailing end thereof leaves the nozzle 26 and enters the molten metal. In certain cases the entire reeling unit may be made to revolve around the mandrel to prevent spinning of the latter as it is drawn by rolls 22.

In order to control the outside diameter of solid tube 16 deposited on mandrel 8 as it travels through molten metal 2, I place in front of the outlet end of vessel 1 a pair of rolls 24 which are held operatively in contact with the outer surface of tube 16. Rolls 24 are interlinked so that as the diameter of tube 16 tends to increase, the rolls are moved further apart and cause a decrease in pressure on a carbon rheostat 29 placed in the shunt field 31 of motor 30 which drives rolls 11 and 12. This will speed up the mandrel and cause the wall thickness of the tube 16 to be reduced. Similarly, a decrease in the outside diameter of the tube 16 will cause the mandrel to travel at a slower speed with a consequent increase in the wall thickness of the tube. Of course, other suitable controlling means may be used.

Fig. 7 illustrates a further modification of a suitable apparatus for carrying the invention into practice, in which mandrel 8 is passed horizontally through vessel 1 filled with molten metal. Vessel 1 is provided with inlet nozzle 32 and outlet nozzle 33 which is tapered to permit easy centering of mandrel 8. The speed of the mandrel is controlled so that the outside diameter of the solidified shell 16 shall equal the inside diameter of the exit nozzle 33 while in said nozzle.

The material used for the construction of receptacle 1 depends on the kind of metal to be handled as in ordinary furnaces, ladles, etc. For instance, cast iron is satisfactory for lead, tin and other low melting point metals while a lining of fire brick or of other suitable refractory may be used for metals having a higher melting point such as copper, nickel, etc.

The inlet port or nozzle for the mandrel 8 may be made of the same material as the furnace lining, depending on the kind of metal used. Due to its smoothness, high refractory qualities, its strength, and the ease with which it is machined, graphite is very suitable for nozzles, especially when using high melting point metals or when the nozzles have a relatively small size. Other suitable materials are carborundum, corundum, magnesite, molded fire clay, etc. The material used for the skimming thimble may be the same as the one used for the nozzles or the furnace lining. For instance, cast iron is suitable for lead, while graphite or other suitable refractories may be used for high melting point metals.

Figure 2:
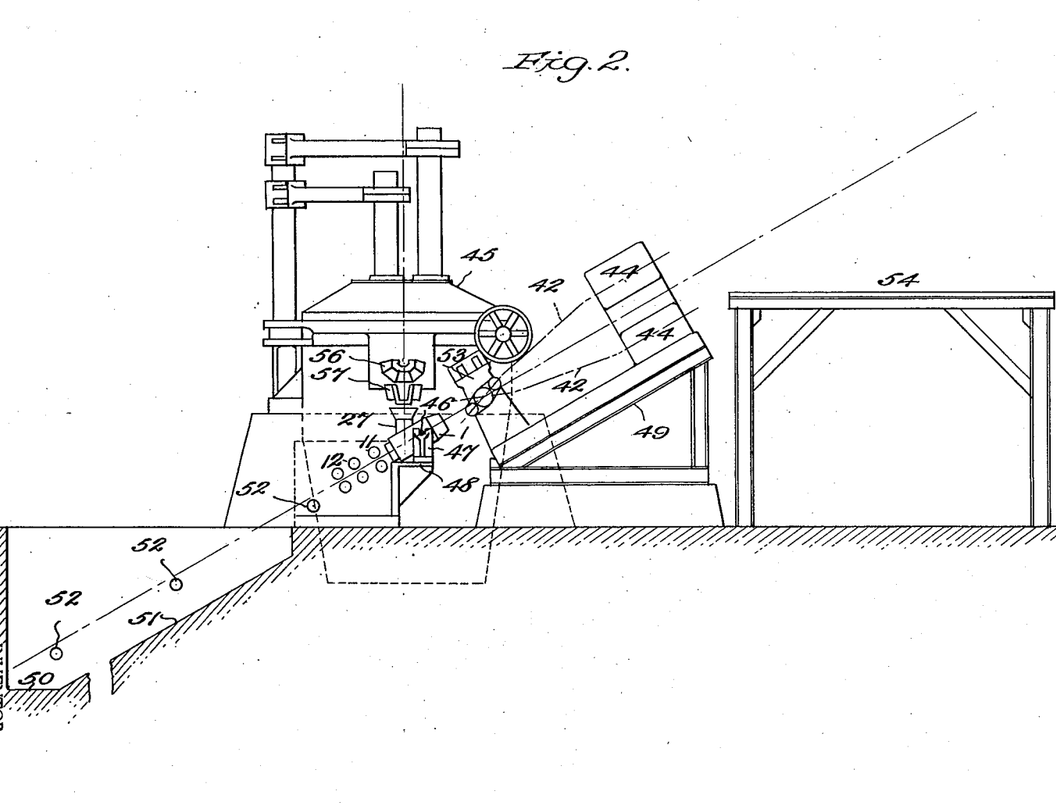
Fig. 2 illustrates a side elevational view, partly in section and partly broken away, of an apparatus and auxiliary units for carrying the present invention into practice.
Figure 3:
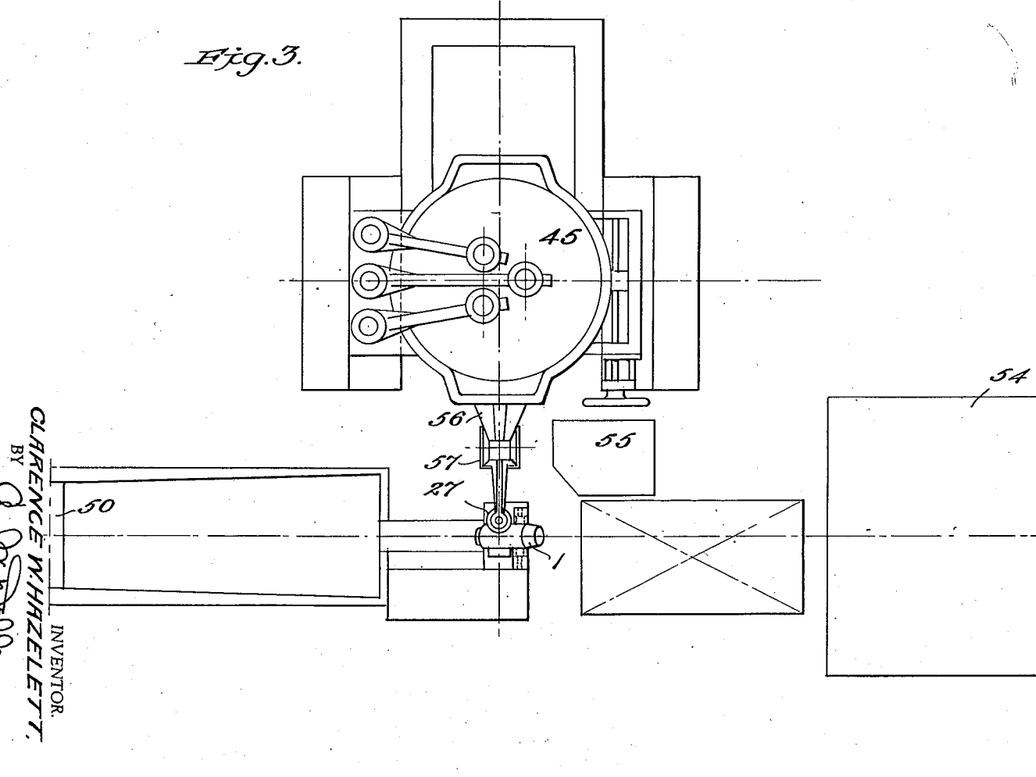
Fig. 3 is a plan top view of Fig. 2.
Figure 6:
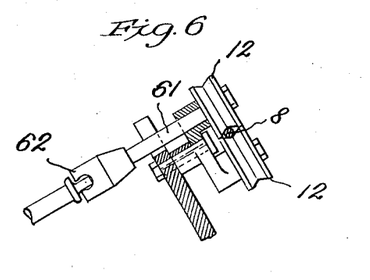

Figs. 2 and 3 show the actual layout of a complete unit for the production of long tubes, about 20 ft. or more, which includes inclined cistern or receptacle 1 for molten metal of the type shown in Fig. 4, a reeling unit, described hereinabove, an electric furnace 45 for feeding the receptacle, a feeding mechanism, etc. Receptacle 1, provided with trunnions 46 which rest on bearings in frame 47 supported by platform 48, is held in a fixed position at a convenient angle. In front of the discharging end of the receptacle 1, a reeling unit, of the type described hereinabove, is supported by frame 49 at the same angle as the receptacle and directly in line therewith. In front of the charging end of the receptacle 1, a charging pit 50 is cut in the floor of the building with one side 51 sloping up to the receptacle at an angle which is approximately the same as that of the cistern and of the reeling unit. The depth of the charging pit and the length of the sloping side 51 thereof should be sufficient to permit convenient handling of mandrels of the maximum length desired. The mechanism for feeding the mandrels to cistern 1 comprises feeding rolls 11 and 12 mounted in a conventional manner in front of the cistern, and guide rollers 52 for supporting and guiding the mandrels 8 which are fed to the cistern. The feeding rollers 12 are provided with a suitable drive including spindle 61 and universal joint 62, as will be readily seen from Fig. 6. It is to be noted that guide rollers 52, feeding rolls 12 and 11, the cistern 1 and the reeling unit are mounted at the same angle and are directly in line with each other. In front of the discharge end of the reeling unit 53 is platform 54 of convenient height for handling the finished product discharged by the reeling machine. The cistern 1 is serviced by tilting electric furnace 45 which may be controlled from operator's platform or pulpit 55. Furnace 45 is tilted to allow the proper amount of molten metal to flow from spout 56 into trough 57, which conveys the metal to tangential inlet 27 of cistern 1.

In carrying the invention into practice, I establish a bath of molten metal in receptacle 1 and I carefully control the depth and the temperature of the bath. The molten metal may be deoxidized, as in ordinary practice for pouring ingots. The depth of the bath is maintained at the desired predetermined value by suitable outlets in the side of receptacle 1 or with low melting point metals by suitable circulating pumps or by regulating the pouring of the metal. The temperature of the bath is controlled by regulating the temperature of the incoming molten metal, and the rate of circulation of the metal through the receptacle. In certain cases, I may employ auxiliary heating or cooling means in connection with receptacle 1 in order to obtain more efficient control of the temperature of the bath. As already described, a more even distribution of the temperature of the bath may be obtained by introducing the incoming molten metal at a tangent to the walls of the receptacle 1, whereby the bath is imparted a circular motion and the incoming hotter stream of molten metal is prevented from impinging directly on the mandrel 8.

Having established a bath having the desired depth and temperature, I then pass therethrough a relatively cold mandrel of the desired size and shape. As the cold mandrel enters the bath, it abstracts heat from the surrounding molten metal and causes the same to freeze as a concentric shell on the outer surface of the mandrel, at a rate which depends on the temperature of the mandrel and of the bath, and on the heat conductivity of the mandrel. The thickness of shell of solid metal formed increases gradually and uniformly as the mandrel progresses through the molten bath, its maximum size depending, other conditions being constant, on the total time during which any given point of the mandrel remains in the bath, which of course depends on the depth of the bath and on the speed of the mandrel.

An important feature of the present invention is the proper control of the temperature of the bath of molten metal. Thus, I have found that when the temperature of the bath is too high, the amount of gas liberated when the metal solidifies is excessive and the resulting shell formed on the mandrel tends to be porous. I have discovered that another source of porosity may be due to gases absorbed, adsorbed, or otherwise held by the surface layer of the metallic mandrel which are released when the mandrel is heated, or to a film of a gas producing substance, such as oil, grease, moisture, etc. which may be present on the surface of the mandrel. I have found that by causing the molten metal to be chilled rapidly on the surface of the layer so as to form a solid and strong shell as rapidly as possible, the gases released by the mandrel are prevented from breaking into and through the shell causing porosity and that the gases held in solution by the liquid metal are expelled without causing any visible porosity. In certain cases, I prefer to remove the occluded gases and the film of gas-producing substances from the surface of the mandrel before it enters the liquid metal. Thus, for instance, by cleaning the mandrel with appropriate solvents or by preheating the same, the substances may be removed. Preheating the mandrel, for instance, by passing it through a gas furnace, through induction devices or other suitable heaters placed in front of the cistern I, as shown at 60 in Fig. 4, will be sufficient to burn out or off the film of gas, vapor and/or gas-producing substances and liberate the occluded gases.

In order to cause a rapid chilling of the molten metal on the solid mandrel, I preferably maintain the temperature of the metal bath very close to the melting point of the metal. Thus, I have found that when the temperature of the bath is controlled to within 100° C. of its freezing point, I am able to produce not only a satisfactory and dense article substantially free from porosity, but that I am also able to control the thickness of the shell to be produced more satisfactorily. Furthermore, by keeping the temperature of the bath close to its melting point, I am able to use higher speeds of the mandrel and obtain heavier deposition of the solid metal. In certain special cases, I may resort to special cooling of the mandrels in order to increase the rate of freezing of the metal and obtain heavier deposits.

When the temperature of the metal bath is not in excess of about 100° C. of its freezing point, I found that I am able to control the wall thickness of the solid shell formed easily and obtain a satisfactory product by controlling the depth of the metal bath and/or the speed of the mandrel. In practice, I have found that a depth of about less than 1 ft. is satisfactory and permits the production of standard gauge tubing at commercial speeds. In general, I have found that with a metal bath less than about 1 ft. deep, the speed of the mandrel is usually higher than about 50 ft. per min. For instance, in producing tubing from lead, brass or "Monel" metal, I can obtain a $\frac{1}{8}''$ wall thickness on a $\frac{1}{2}''$ mandrel traveling at a speed of about 75 ft. per min. through a 6'' bath, the temperature of the metal being less than about 100° C. above its melting point.

The size and character of the mandrel used determines within certain limits the wall thickness of tubing obtainable by my process. Thus, the amount of heat which can be abstracted from a body of metal at a certain temperature, and consequently the amount of metal that can be made to freeze, depends on the size and on the heat capacity of the mandrel. In general, I have found that mandrels larger than about $\frac{1}{4}''$ in diameter have sufficient heat capacity and can produce finished tubing of the usual wall thickness or even higher. Mandrels having a diameter less than about $\frac{1}{4}''$ have a limited cooling capacity and permit only making of tubing of lighter gauge. Under normal operating conditions, as hereinabove indicated, I can obtain about $\frac{1}{16}''$ wall thickness on a $\frac{1}{8}''$ mandrel. A heavier wall may be obtained in some instances by supercooling the mandrel and by maintaining the temperature of the bath close to its melting point. A 2'' diameter mandrel will cool a shell about $\frac{5}{8}''$ thick when the molten bath is only a few degrees above its melting point. If a mandrel is heated close to the melting point of the molten metal and made to travel at a high speed, very thin wall tubing may be produced. For example, sound tubing having wall thickness as low as about .006'' has been produced.

Another method of increasing the wall thickness of the tubing is to pass the mandrel repeatedly through a series of molten baths with intermediate cooling before each immersion, thereby forming a plurality of concentric layers on the mandrel. As a matter of fact, the production of tubular products having a plurality of concentric layers is one of the features of the present invention. I have found that a multiple wall tubular product produced according to the principle of the present invention has improved properties such as greater flexibility than a solid product of similar size and shape. For instance, copper wire made by repeatedly passing a wire or rod through molten copper and where I purposely prevent the superimposed layers from welding with each other produces a product having greater flexibility than solid wire and more like stranded wire. Cored copper products produced by the present method are especially useful as conductors. For producing solid rod or wire, I may between successive passes flux or deoxidize the surface of the previous layer to cause the next shell to become welded thereto.

Similarly, the process may be used for making bi-metallic or composite tubing or other tubular shapes, in which the base may be for instance steel, and an outer layer of stainless steel, copper, lead, or the like.

Likewise, I may use my process for the production of composite solid products, such as aluminum or copper clad steel wire. A similar product may be one in which a solid core is, for instance, made of steel, and an outer layer is made of copper, aluminum or lead deposited thereon according to the principles of the present invention.

For the production of tubing the amount of work imparted to my product, as hereinabove indicated, should be sufficient to loosen the solid outer shell from the inner mandrel and facilitate removal of the latter. However, it may be desirable to impart a sufficient amount of work to the shell to break up the cast structure of the metal. If a hot worked structure is desired in the finished product, the work may be applied as soon as the mandrel leaves the metal bath and before the metal cools below the recrystallization temperature while a cold worked structure may be obtained by finishing at a temperature lower than the recrystallization temperature of the metal. It is to be observed, however, that the desired structure may be imparted to the tubular product by first loosening the tube from the mandrel and then subjecting the freed tube to any suitable working and annealing operations, etc.

The length of the tubing produced depends on the length of the mandrels used. Usually, no difficulty is found in breaking the shell at the junction of two adjacent mandrels while the metal is still hot and relatively soft. This may be done by leaving the mandrel unsupported as it leaves the reeling machine in which case the weight of the unsupported mandrel is usually sufficient to break the tubing at its junction with the following mandrel still in the reeling machine. However, other methods may be used for separating the mandrels. For instance, the speed of the pulling rolls may be temporarily increased as the trailing end of mandrel enters the molten bath to separate it from the following mandrel or any other means to reduce the thickness after formation of a shell at the junction between mandrels.

It is to be observed that the present invention provides a simple and efficient method of producing tubular products directly from molten metal, which is capable of being carried into commercial practice satisfactorily and economically.

Furthermore, it is to be noted that the present invention provides a process of producing tubular products directly from the molten metal in which the product is formed entirely within a body of the molten metal by abstracting heat therefrom through a cooling body in the molten metal whereby a shell of solid metal is caused to freeze on said cooling body.

Moreover, the invention provides ways and means of controlling the rate of formation of the solid shell to form a tubular product having the desired wall thickness and substantially uniform cross-section.

A special feature of the invention is the temperature control of the metal bath, which is maintained at a temperature close to the melting point of the metal and preferably not in excess of 100° C. above the melting point, and the rapid chilling of the molten metal over the relatively cold mandrel. Other important features of the invention are the provisions hereinabove more fully disclosed, to insure that every part of the mandrel remains in the molten metal for the same interval of time, the controlling of the thickness of the shell solidified on the mandrel by varying the height of the metal bath, or the speed of the mandrel, or the temperature of the metal bath or of the mandrel, and the working of the solidified shell, preferably before it cools, to expand the same over the mandrel and facilitate removal of the latter.

In carrying the invention into practice, it is preferred in the production of articles composed of low melting metals or alloys, such as lead, zinc, etc., to pre-heat the mandrels to a temperature somewhat higher than 212° F. to remove moisture, etc. adhering thereto and it is preferred in the production of articles composed of high melting metals or alloys, such as aluminum, copper, steel, nickel, etc., to pre-heat the mandrels to a temperature of from about 500° F. to about 1000° F. By proceeding in this manner, the metal or alloy of the molten bath forms a sound, uniform and non-porous or hole-free hollow or tubular product.

It is to be observed that the present invention provides a method of producing hollow or tubular products directly from a metal or alloy in a molten bath on a moving mandrel which solidifies the product within the molten bath and out of contact with the air or atmosphere or oxygen-containing gas. With this novel procedure the heat is abstracted internally from the hollow product and in the case of a tubular product practically radially to the mandrel. As a mandrel made of steel, for instance, has considerable heat capacity, the molten metal surrounding the mandrel is solidified quickly into a solid shell. By taking the heat capacity and heat conductivity of the mandrel and the latent heat of fusion of the metal or alloy under treatment and the heat conductivity thereof and the temperature of the mandrel and of the molten bath into account, the speed of the moving mandrel through the molten bath may be regulated to obtain optimum production and best results. The internal abstraction of heat via and to a solid auxiliary mandrel insures rapid chilling and solidification of the molten metal and makes it possible to produce hollow articles or tubing at a high rate of speed as described herein.

It is to be noted that the present invention is capable of producing hollow articles or tubes with a chilled internal surface or structure and with a worked or refined external surface or structure. In the internal surface, the grains or crystals are more or less arranged radially to the surface and in the external surface, they are in a refined or worked state. By producing an article with a chilled inner surface and a worked external surface, the article is useful for resisting corrosion as in the flow of liquids or fluids, etc. and the article has strength and toughness.

Although the present invention has been described in connection with certain preferred embodiments thereof, it is to be observed that variations and modifications may be resorted to by those skilled in the art. Thus, a reducing atmosphere may be provided at the mandrel inlet and at the upper surface of the molten bath as in any appropriate manner as by a burning flame, etc. Similarly, the exit end of the apparatus and the reeling machine may be enclosed in a chamber provided with a reducing atmosphere. In this manner, there will be no opportunity for oxidizing either the interior or the exterior of the tubing or hollow product.

I claim:—

1. The method of producing metallic tubular products which comprises rapidly chilling molten metal on the surface of a moving metallic mandrel to form thereon a solid shell, plastically deforming said solidified shell to expand the same over the mandrel, and separating said solidified shell from said mandrel.

2. The method of producing metallic tubular products which comprises rapidly chilling molten metal on the surface of a moving metallic mandrel to form thereon a solid shell, plastically deforming said solidified shell before it cools substantially to work the same over the mandrel, and separating said solidified shell from said mandrel.

3. The method of producing metallic tubular products which comprises establishing a body of molten metal, passing a mandrel through said molten metal, said mandrel being at a temperature substantially lower than the melting point of said metal whereby molten metal solidifies as a shell on the surface of said mandrel, plastically deforming said solidified shell to expand the same over the mandrel, and separating said solidified shell from said mandrel.

4. The method of producing metallic tubular products which comprises establishing a body of molten metal, maintaining said molten metal at a temperature close to the melting point of the metal, passing a relatively cold mandrel through said molten metal, whereby molten metal solidifies as a shell on the surface of the mandrel, working said solidified shell to expand the same over the mandrel and to convert the same from a cast structure to a refined structure, and separating said expanded shell from said mandrel.

5. The method of producing metallic tubular products which comprises, establishing a body of molten metal, maintaining said molten metal at a temperature less than about 100° C. higher than the melting point of said metal, passing a relatively cold metallic mandrel through said molten metal, whereby molten metal solidifies as a shell on the surface of the mandrel, subjecting said solidified shell to lateral rolling on said mandrel to expand said shell over said mandrel, and separating said expanded shell from said mandrel.

6. The method of producing metallic tubular products which comprises establishing a body of molten metal, maintaining said molten metal at a temperature close to the melting point of the metal, passing a relatively cold mandrel through said molten metal, whereby molten metal solidifies as a shell on the surface of the mandrel, working said solidified shell before it cools to any substantial extent to expand the same over the mandrel and to convert the same from a cast structure to a refined structure, and separating said expanded shell from said mandrel.

7. The method of producing metallic tubular products which comprises, establishing a body of molten metal of substantially constant height, maintaining said body of molten metal at a substantially uniform temperature close to the melting point of the metal, passing a relatively cold metallic mandrel through said molten metal, whereby molten metal solidifies as a shell on the surface of the mandrel, maintaining practically all portions of the surface of said mandrel in said molten metal substantially for the same interval of time to produce uniform thickness of said solidified shell, plastically deforming said solidified shell to expand the same over the mandrel, and separating said expanded shell from said mandrel.

8. The method of producing metallic tubular products which comprises, establishing a body of molten metal of substantially constant height, maintaining said body of molten metal at a substantially uniform temperature close to the melting point of the metal, passing a relatively cold metallic mandrel through said molten metal, whereby molten metal solidifies as a shell on the surface of the mandrel, maintaining practically all portions of the surface of said mandrel in said molten metal substantially for the same interval of time to produce uniform thickness of said solidified shell, regulating the time during which said mandrel remains in contact with said molten metal to control the thickness of said shell, plastically deforming said solidified shell to expand the same over the mandrel, and separating said expanded shell from said mandrel.

9. The method of producing metallic tubular products which comprises establishing a body of molten metal of substantially constant height, maintaining said body of molten metal at a substantially uniform temperature close to the melting point of the metal, passing a relatively cold metallic mandrel through said molten metal whereby molten metal solidifies as a shell on the surface of the mandrel, maintaining practically all portions of the surface of said mandrel in said molten metal substantially for the same interval of time to produce uniform thickness of said solidified shell, regulating the speed of the mandrel through said body of molten metal to control the thickness of said shell, plastically deforming said solidified shell to expand the same over the mandrel, and separating said expanded shell from said mandrel.

10. The method of producing metallic tubular products which comprises establishing a body of molten metal of substantially constant height, maintaining said body of molten metal at a substantially uniform temperature close to the melting point of the metal, passing a relatively cold metallic mandrel through said molten metal whereby molten metal solidifies as a shell on the surface of the mandrel, maintaining practically all portions of the surface of said mandrel in said molten metal substantially for the same interval of time to produce uniform thickness of said solidified shell, regulating the distance through which said mandrel travels in said body of molten metal to control the thickness of said shell, plastically deforming said solidified shell to expand the same over the mandrel, and separating said expanded shell from said mandrel.

11. The method of producing metallic tubular products which comprises establishing a body of molten metal of substantially constant height, maintaining said body of molten metal at a substantially uniform temperature close to the melting point of the metal, passing a relatively cold metallic mandrel through said molten metal, whereby molten metal solidifies as a shell on the surface of the mandrel, maintaining practically all portions of the surface of said mandrel in said molten metal substantially for the same interval of time to produce uniform thickness of said solidified shell, controlling the temperature of said molten metal to regulate the thickness of said shell, plastically deforming said solidified shell to expand the same over the mandrel, and separating said expanded shell from said mandrel.

12. The method of producing metallic tubular products which comprises establishing a body of molten metal of substantially constant height, maintaining said body of molten metal at a substantially uniform temperature close to the melting point of the metal, passing a relatively cold metallic mandrel through said molten metal whereby molten metal solidifies as a shell on the surfaces of the mandrel, maintaining practically all portions of the surface of said mandrel in contact with said molten metal substantially for the same interval of time to produce uniform thickness of said solidified shell, controlling the temperature of said mandrel to regulate the thickness of said shell, plastically deforming said solidified shell to expand the same over the mandrel, and separating said expanded shell from said mandrel.

13. The method of producing metallic tubular products which comprises establishing a body of molten metal of substantially constant height, maintaining said body of molten metal at a substantially uniform temperature close to the melting point of the metal, maintaining a non-oxidizing atmosphere over said molten metal, passing a relatively cold metallic mandrel through said molten metal, whereby molten metal solidifies as a shell on the surface of the mandrel, maintaining practically all portions of the surface of said mandrel in said molten metal substantially for the same interval of time to produce uniform thickness of said solidified shell, plastically deforming said solidified shell to expand the same over the mandrel, and separating said expanded shell from said mandrel.

14. The method of producing metallic tubular products which comprises establishing a body of molten metal of substantially constant height, maintaining said body of molten metal at a substantially uniform temperature close to the melting point of the metal, consecutively feeding a plurality of relatively cold mandrels through said molten metal, maintaining a substantially unbroken passage of said mandrels through said molten metal, whereby molten metal solidifies as a shell on the surface of said mandrels, maintaining practically all positions of the surface of said mandrels in said molten metal for substantially the same interval of time to produce uniform thickness of said solidified shell, controlling the speed of mandrels through said molten metal to regulate the thickness of said solidified shell, laterally rolling said solidified shell on said mandrels before said solidified shell cools substantially to expand said shell over said mandrels, and separating said expanded shell from said mandrels.

15. The method of producing metallic tubular products which comprises establishing a body of molten metal of substantially constant height, maintaining said body of molten metal at a substantially uniform temperature close to the melting point of the metal, consecutively feeding a plurality of relatively cold mandrels through said molten metal, maintaining a substantially unbroken passage of said mandrels through said molten metal, whereby molten metal solidifies as a shell on the surface of said mandrels, maintaining practically all portions of the surface of said mandrels in said molten metal for substantially the same interval of time to produce uniform thickness of said solidified shell, controlling the speed of said mandrels through said molten metal to regulate the thickness of said solidified shell, laterally rolling said solidified shell on said mandrels before said solidified shell cools substantially to expand said shell over said mandrels, separating said shell at the end of each mandrel and withdrawing said mandrels from said shell.

16. The method of producing metallic tubular products which comprises establishing a body of molten metal of substantially constant height, maintaining said body of molten metal of a substantially uniform temperature close to the melting point of the metal, consecutively feeding a plurality of relatively cold mandrels through said molten metal, maintaining a substantially unbroken passage of said mandrels through said molten metal, whereby molten metal solidifies as a shell on the surface of said mandrels, maintaining practically all portions of the surface of said mandrels in said molten metal for substantially the same interval of time to produce uniform thickness of said solidified shell, controlling the speed of said mandrels through said molten metal to regulate the thickness of said solidified shell, supplying additional molten metal to said body of molten metal so as not to disturb said frozen shell.

17. The method of producing metallic tubular products which comprises establishing an inclined body of molten metal having a free surface, maintaining said body of molten metal at a substantially uniform temperature close to the melting point of the metal, maintaining the height of said body of molten metal substantially constant, consecutively passing a plurality of relatively cold mandrels upwardly through said inclined body of molten metal and at approximately the same angle of inclination as said body of molten metal, whereby molten metal solidifies as a shell on the surface of said mandrels, maintaining practically all portions of the surface of said mandrels in said molten metal substantially for the same interval of time to produce substantially uniform thickness of said solidified shell, laterally rolling said solidified shell on said mandrels to expand said shell over said mandrels before said shell cools substantially, and separating said expanded shell from said mandrels.

18. The method of producing metallic tubular products which comprises establishing an inclined body of molten metal having a free surface, maintaining said body of molten metal at a substantially uniform temperature close to the melting temperature of the metal, maintaining a non-oxidizing atmosphere over said molten metal, maintaining the height of said body of molten metal substantially constant, consecutively feeding a plurality of relatively cold mandrels upwardly through said inclined body of molten metal and at approximately the same angle of inclination as said body of molten metal, whereby molten metal solidifies as a shell on the surface of said mandrels, introducing said mandrels into said body of molten metal through a port located in a plane substantially parallel to the upper surface of said body of molten metal, withdrawing said mandrels and solidified shell through said upper surface of said molten metal, thereby producing substantially uniform thickness of said solidified shell, laterally rolling said solidified shell on said mandrels before said shell cools substantially to expand said shell over said mandrels, and separating said expanded shell from said mandrels.

19. The method of producing metallic tubular products which comprises establishing a body of molten metal of substantially constant height, maintaining said body of molten metal at a substantially uniform temperature close to the melting point of the metal, consecutively feeding a plurality of relatively cold mandrels vertically and upwardly through said molten metal, maintaining a substantially unbroken passage of said mandrels through said molten metal, whereby molten metal solidifies as a shell on the surface of said mandrels, supplying additional molten metal to said body of molten metal in a direction substantially tangent to the surface of said mandrels, controlling the speed of said mandrels through said molten metal to control the thickness of said solidified shell laterally rolling said solidified shell on said mandrel before said shell cools substantially to expand said shell over said mandrels and separating said expanded shell from said mandrels.

20. The method of producing metallic tubular products which comprises establishing a body of molten metal, maintaining said body of molten metal at a substantially uniform temperature close to the melting point of the metal, consecutively feeding a plurality of relatively cold mandrels horizontally through said molten metal, maintaining substantially unbroken passage of said mandrels through said molten metal, whereby molten metal solidifies as a shell on the surface of said mandrels, supplying additional molten metal to said body of molten metal in a direction substantially tangent to the surface of said mandrels, controlling the speed of said mandrels through said molten metal to control the thickness of said solidified shell, laterally rolling said solidified shell before the same cools substantially to expand said shell over said mandrels and separating said expanded shell from said mandrels.

21. The method of producing metallic products directly from molten metal which comprises passing a relatively cold core through a body of molten metal maintained at a temperature close to the melting point of the metal, in such a manner that the core is introduced at a region remote from the top surface of said body, whereby metal solidifies on the surface of said core, and subjecting said metallic product to work.

22. The method of producing concentric metallic products directly from molten metal which comprises repeatedly passing a relatively cold core through a body of molten metal maintained at a temperature close to the melting point of the metal, whereby metal solidifies on the surface of said core, and subjecting said metallic product to work following its passage through said molten metal.

23. An apparatus for producing metallic products directly from molten metal which comprises a receptacle for holding a body of molten metal, inlet means operatively associated with said receptacle for passing mandrels through the molten metal in said receptacle, means operatively associated with said receptacle for withdrawing said mandrels from said molten metal, and means for working metal solidified on said mandrel.

24. An apparatus for producing metallic tubular products directly from molten metal which comprises a receptacle for holding a body of molten metal, an inlet port in said receptacle for passing mandrels through the molten metal in said receptacle whereby metal solidifies as a solid shell on the surface of said mandrels, outlet port on said receptacle for said mandrels and said solidified shell, means for consecutively feeding mandrels through said receptacle operatively mounted in front of said inlet port, means for withdrawing said mandrels and solidified shell from said molten metal and means for working said solidified shell on said mandrels operatively mounted in front of said outlet port.

25. An apparatus for producing metallic tubular products directly from molten metal which comprises a receptacle for holding a body of molten metal, an inlet port in said receptacle for passing mandrels through the molten metal in said receptacle whereby metal solidifies as a solid shell on the surface of said mandrel, outlet port in said receptacle for said mandrels and said solidified shell, means for consecutively feeding mandrels through said receptacle operatively mounted in front of said inlet port, means for withdrawing said mandrels and solidified shell from said molten metal, means for working said solidified shell on said mandrels operatively mounted in front of said outlet means, and means for supplying molten metal to said receptacle in a direction substantially tangent to the line of travel of said mandrel.

26. An apparatus for producing metallic tubular products directly from molten metal which comprises a receptacle for holding a body of molten metal, an inlet port in said receptacle for passing mandrels through the molten metal in said receptacle whereby metal solidifies as a solid shell on the surface of said mandrel, outlet port in said receptacle for said mandrels and said solidified shell, means for consecutively feeding mandrels through said receptacle operatively mounted in front of said inlet port, means for withdrawing said mandrels and solidified shell from said molten metal, means for working said solidified shell on said mandrels operatively mounted in front of said outlet port, means for supplying molten metal to said receptacle in a direction substantially tangent to the line of travel of said mandrel, and means for controlling the height of the molten metal in said receptacle.

27. An apparatus for producing metallic tubular products directly from molten metal which comprises a receptacle for holding a body of molten metal, an inlet port in said receptacle for passing mandrels through the molten metal in said receptacle whereby metal solidifies as a solid shell on the surface of said mandrel, outlet port in said receptacle for said mandrels and said solidified shell, means for consecutively feeding mandrels through said receptacle operatively mounted in front of said inlet port, means for withdrawing said mandrels and solidified shell from said molten metal, means for working said solidified shell on said mandrels operatively mounted in front of said outlet port, means for supplying molten metal to said receptacle in a direction substantially tangent to the line of travel of said mandrel, means for controlling the height of the molten metal in said receptacle, and means for controlling the speed of said mandrels through said molten metal.

28. An apparatus for producing metallic tubular products directly from molten metal which comprises a receptacle for holding a body of molten metal, an inlet port in said receptacle for passing mandrels through the molten metal in said receptacle whereby metal solidifies as a solid shell on the surface of said mandrel, outlet port in said receptacle for said mandrels and said solidified shell, means for consecutively feeding mandrels through said receptacle operatively mounted in front of said inlet port, means for withdrawing said mandrels and solidified shell from said molten metal, means for working said solidified shell on said mandrels operatively mounted in front of said outlet means, means for supplying molten metal to said receptacle in a direction substantially tangent to the line of travel of said mandrel, means for controlling the height of the molten metal in said receptacle, and means operatively associated with the surface of said solidified shell for varying the speed of said mandrels through said molten metal as the diameter of said shell varies whereby said diameter of the solidified shell is maintained substantially constant.

29. An apparatus for producing metallic tubular products directly from molten metal which comprises a receptacle for holding a body of molten metal, an inlet port in said receptacle for passing mandrels through the molten metal in said receptacle whereby metal solidifies as a solid shell on the surface of said mandrel, outlet ports in said receptacle for said mandrels and said solidified shell, means for consecutively feeding mandrels through said receptacle operatively mounted in front of said inlet port, means for withdrawing said mandrels and solidified shell from said molten metal, means for working said solidified shell on said mandrels operatively mounted in front of said outlet means, means for supplying molten metal to said receptacle in a direction substantially tangent to the line of travel of said mandrel, means for controlling the height of the molten metal in said receptacle, means for controlling the speed of said mandrels through said molten metal, and means operatively associated with said feeding means for preventing said inlet means from remaining open.

30. An apparatus for producing metallic tubular products directly from molten metal which comprises a receptacle for holding a body of molten metal, an inlet port in the bottom of said receptacle for passing mandrels upwardly through said body of molten metal whereby metal solidifies as a shell on the surface of said mandrels, said port having sufficient clearance for allowing free sliding of said mandrels without letting molten metal run down into said clearance, feeding rolls for consecutively feeding mandrels upwardly through said receptacle operatively mounted in front of said port, pulling rolls for withdrawing said mandrels and said solidified shell operatively mounted above said body of molten metal, means for supplying molten metal in a direction substantially tangential to the side walls of said receptacle, means for controlling the height of the metal in said receptacle, means for controlling the speed of said mandrels through said molten metal, and means for working said solidified shell on said mandrels to expand said shell over said mandrels.

31. An apparatus for producing metallic tubular products directly from molten metal which comprises a receptacle for holding a body of molten metal, an inlet port in the bottom of said receptacle for passing mandrels upwardly through said body of molten metal whereby metal solidifies as a shell on the surface of said mandrels, said port having sufficient clearance for allowing free sliding of said mandrels without letting molten metal run down therethrough, feeding rolls for consecutively feeding mandrels upwardly through said receptacle operatively mounted in front of said port, pulling rolls for withdrawing said mandrels and said solidified shell operatively mounted above said body of molten metal, means for supplying molten metal in a direction substantially tangential to the side walls of said receptacle, means for controlling the height of the metal in said receptacle, means operatively associated with the outer surface of said solidified shell for regulating the speed of said mandrels through said molten metal, whereby the diameter of said shell is maintained substantially constant, means operatively associated with said feeding rolls whereby said pulling rolls are stopped when no mandrel is between said feeding rolls, rollers for working said solidified shell on said mandrels, said rollers being freely mounted around said shell on a rotatable frame and said rollers being driven by friction as said shell and mandrels are pulled therethrough, and means for rotating said frame to substantially prevent revolving of said shell and mandrels.

32. An apparatus for producing metallic products directly from molten metal which comprises an inclined receptacle for holding a body of molten metal having a free surface, an inlet port operatively associated with the lower part of said receptacle for feeding mandrels upwardly at an angle through said receptacle, whereby molten metal solidifies as a shell on said mandrels, said inlet port having an internal face within said receptacle located in a substantially horizontal plane, means for feeding said mandrels to said receptacle operatively associated with said inlet port, outlet means for withdrawing said mandrels and solidified shell from said molten metal, and means for working said solidified shell on said mandrels operatively associated with said outlet means.

33. An apparatus for producing metallic products directly from molten metal which comprises a receptacle for holding a body of molten metal, inlet means on said receptacle for passing mandrels horizontally through said receptacle, whereby molten metal solidifies as a shell on the surface of said mandrels, outlet means on said receptacles for said mandrels and said solidified shell, means for feeding mandrels through said receptacle operatively associated with said inlet means, and means for working said solidified shell on said mandrels operatively associated with said outlet means.

34. The method of producing metallic tubular products which comprises establishing a body of molten metal, causing relative movement between a mandrel and said molten metal, said mandrel being at a temperature substantially lower than the melting point of said metal whereby molten metal solidifies as a shell on the surface of said mandrel, plastically deforming said solidified shell to expand the same over the mandrel, and separating said solidified shell from said mandrel.

35. The method of producing metallic tubular products which comprises establishing a body of molten metal, passing a metallic mandrel through said body of molten metal in such a manner that the mandrel is introduced into said body at a region away from the top surface of said body whereby molten metal is solidified as a shell on said metallic mandrel, and subsequently separating said solidified shell from said mandrel.

36. The method of producing metallic tubular products which comprises establishing a body of molten metal, maintaining said body of molten metal at a temperature close to the melting point thereof, introducing a metallic mandrel into said body at a region remote from the top surface of said body, passing said mandrel through said body to cause molten metal to solidify thereon as a shell, and subsequently separating said solidified shell from said mandrel.

37. The method of producing metallic tubular products which comprises establishing a body of molten metal, maintaining said body of molten metal at a temperature not higher than about 100° C. above the melting point thereof, introducing a metallic mandrel into said body at a region remote from the top surface thereof, passing said mandrel through said body to cause molten metal to solidify thereon as a shell, deforming said shell on said mandrel at least to the extent of loosening said shell on said mandrel, and subsequently removing said shell from said mandrel.

38. The method of producing metallic tubular products which comprises establishing a body of molten metal, introducing a relatively cold metallic mandrel with respect to said molten metal into said body at a region remote from the surface thereof, passing said mandrel through said body to cause molten metal to be chilled on the surface of said mandrel and to form a solid shell thereon, plastically deforming said shell on said mandrel to the extent of loosening said shell, and subsequently removing said loosened shell from said mandrel.

CLARENCE W. HAZELETT.